United States Patent [19]
Oh

[11] Patent Number: 5,886,492
[45] Date of Patent: *Mar. 23, 1999

[54] SERVO CONTROL APPARATUS AND METHOD FOR VIDEO CASSETTE TAPE RECORDER

[75] Inventor: Young Gyo Oh, Kyungki-Do, Rep. of Korea

[73] Assignee: L.G. Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 584,442

[22] Filed: Jan. 11, 1996

[30] Foreign Application Priority Data

Jan. 7, 1995 [KR] Rep. of Korea ............... 1995 217

[51] Int. Cl.$^6$ ........................................... G05B 1/02
[52] U.S. Cl. ................ 318/608; 318/616; 318/625; 318/632; 360/70; 360/73.01; 360/77.12
[58] Field of Search .................... 310/569, 632, 310/606–608, 600–603, 615–618, 625; 360/70–71, 73.01, 73.14, 77.12

[56] References Cited

U.S. PATENT DOCUMENTS

| | | |
|---|---|---|
| 4,212,039 | 7/1980 | Koda ........................ 318/696 |
| 4,484,235 | 11/1984 | Yokobori et al. ............ 388/812 |
| 4,635,138 | 1/1987 | Louth ......................... 360/10.3 |
| 4,772,966 | 9/1988 | Sharples et al. ............. 360/71 |
| 5,004,965 | 4/1991 | Otokawa et al. ........... 318/254 |
| 5,233,433 | 8/1993 | Suesada et al. ............ 358/310 |
| 5,233,488 | 8/1993 | Yanagihara ................. 360/77.15 |
| 5,262,874 | 11/1993 | Ryan ......................... 358/335 |
| 5,400,370 | 3/1995 | Guo ........................... 375/118 |
| 5,448,369 | 9/1995 | Lee et al. ................... 358/335 |
| 5,452,333 | 9/1995 | Guo et al. .................. 375/371 |

*Primary Examiner*—David Martin
*Attorney, Agent, or Firm*—Birch, Stewart, Kolasch & Birch, LLP

[57] ABSTRACT

An improved servo control device and method for a VCR that minimizes jitter caused in a reproducing mode of the VCR (reproducing VCR) when it reproduces a video signal recorded by another VCR (recording VCR). A recording characteristic of the recording VCR (such as a duty interval of horizontal synchronous signals contained in the video signal) is used along with one or more reproducing characteristics (such as speed and phase) of the reproducing VCR to control a rotation speed of the reproducing VCR's drum motor.

22 Claims, 8 Drawing Sheets

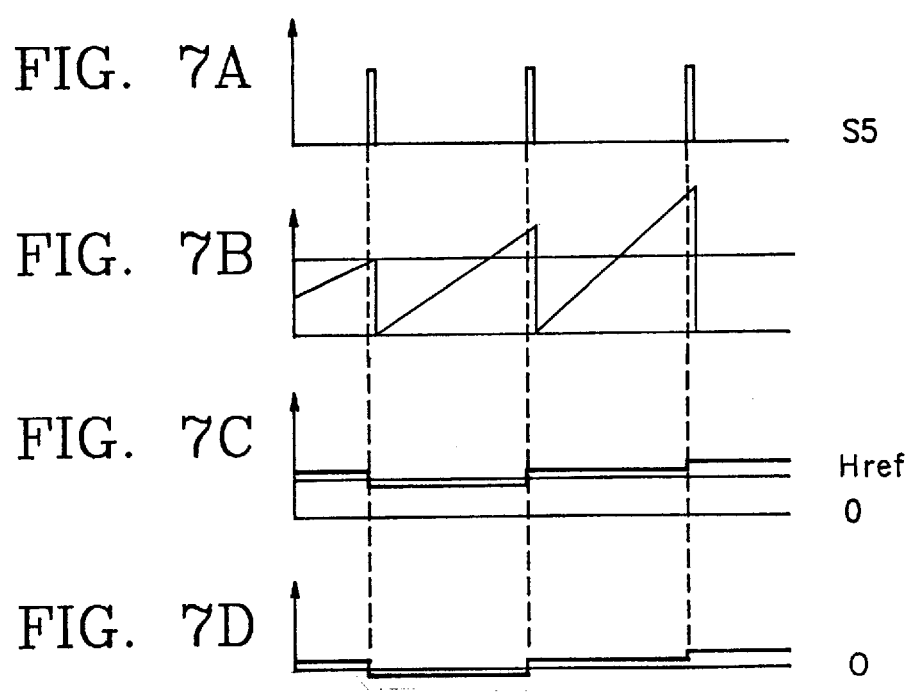

5,886,492

SERVO CONTROL APPARATUS AND METHOD FOR VIDEO CASSETTE TAPE RECORDER

BACKGROUND OF THE INVENTION

1. Field of the Invention

The present invention relates to a servo control apparatus and method for a video cassette tape recorder (VCR), and in particular to an improved servo control apparatus and method for a VCR capable of minimizing jitters caused in a reproducing mode of the VCR by detecting a duty interval of a reproduced horizontal synchronous signal and controlling the rotation speed of a drum motor using the thusly detected duty interval.

2. Description of the Conventional Art

Generally, as well known to those skilled in the art, the servo control system of a VCR is classified into a drum servo for controlling a drum motor and a capstan servo for controlling a capstan motor. The capstan servo system is directed to transferring tape in a horizontal direction with a vector Vc, and the drum servo system is directed to controlling the rotation of the drum which rotates at a certain angle about a tape surface. FIG. 1 shows a conventional video tape track representing a tape run by the capstan servo system and the drum rotation which is controlled by the drum servo system.

FIG. 2 shows a conventional servo system of a VCR. The control loop drives the drum motor 1 by a driving force of a drum motor driving unit 15. A magnetic sensor 4 detects the number of rotations of the drum motor 1 with a rotary sensor 2. As shown in FIG. 3A, a certain detection signal which corresponds to the rotation of the drum motor 1 is output from the rotary sensor 2 and converted into a detection signal FG, having a wave form as shown in FIG. 3B, by a second pulse shaping unit 10. The detection signal FG is output to a speed driving signal generator 11.

As shown in FIG. 3C, the speed driving signal generator 11 resets a counter (not shown) at a leading edge of a detection signal FG, and outputs the counter value at the leading edge of the detection signal FG to obtain the wave form "c" shown in FIG. 3D. The speed driving signal of the speed driving signal generator 11 is inputted to a speed/phase control value adder 13 through a first filter 12. The output signal thereof is converted into an analog signal by a D/A converter 14, and is outputted to a drum motor driving unit 15. The drum motor driving unit 15 outputs a driving output corresponding to its input signal thereby driving the drum motor 1.

Meanwhile, regarding the phase control loop of the drum motor 1, a magnetic sensor 3, which is directed to detecting the phase of the drum motor 1, outputs a pulse with respect to the rotation of the drum motor 1 as shown in FIG. 3E. The output from the magnetic sensor 3 is converted into a rectangular wave form, a phase detection signal PG, by a first pulse shaping unit 5 as shown in FIG. 3F, and outputted to the phase driving signal generator 6. The phase driving signal generator 6 receives the output of the first pulse shaping unit 5 and a reference signal ref, as shown in FIG. 3G, which is output from a switch 9. The phase driving signal generator 6 performs a certain count operation as shown in FIG. 3H. That is, the phase driving signal generator 6 resets a counter (not shown) whenever the reference signal ref is inputted thereto, and outputs the count value as a phase driving signal "f", as shown in FIG. 3I, whenever the phase detection signal (See FIG. 3F) is input thereto. The reference signal ref of the phase driving signal generator 6 varies in accordance with a recording mode or a reproducing mode. In a recording mode, a vertical synchronous signal Vsync is inputted as a reference signal ref as shown in FIG. 3J, and in a reproducing mode, a signal "i", shown in FIG. 3L, outputted from the reference signal generator 8 is inputted as a reference signal.

The switch 9 is switched in accordance with a recording/reproducing mode signal REC/PB outputted from a system controller (not shown), and determines a reference signal which is applied to the phase driving signal generator 6. The reference signal generator 8 includes a free run counter having a cycle Vsync of a TV as shown in FIG. 3K, and outputs a reproducing reference pulse "i" when an overflow occurs by the counter.

The phase driving signal "f" outputted from the phase driving signal generator 6' is outputted to the speed/phase control value adder 13 through a second filter 7, added to the speed control value outputted from the first filter 12, and converted into an analog value by the D/A converter 14, The thusly converted analog voltage is amplified by the drum motor driving unit 15 for driving the drum motor 1.

Although the drum and capstan motors are accurately controlled using the above-described control loops, when a tape recorded by a certain VCR set is reproduced by another VCR set, jitters occur because of the following reasons: First, the surface of the drum differs on each VCR set. Second, there is a load difference for the load of the tape running mechanism. Third, the speed difference of the drum motor and the speed difference of the capstan motor differ from each other due to speed and phase differences between each VCR set.

The above-mentioned differences result in difference between the horizontal synchronous signals of the video signal on the tape at the time of recording by the video head H1 of the drum motor.

Therefore, apparatuses such as a time base corrector for resolving the above-mentioned problems are introduced in the industry. Such an apparatus is directed to minimizing jitters of the picture by using memory. However, since such an apparatus requires additional memory, fabrication cost is high.

SUMMARY OF THE INVENTION

Accordingly, it is an object of the present invention to provide a servo control apparatus and method for a VCR which overcome the problems encountered in a conventional servo control apparatus and method for a VCR.

It is another object of the present invention to provide an improved servo control apparatus and method for a VCR capable of minimizing jitter caused in a reproducing mode of the VCR by detecting a duty interval of reproduced horizontal synchronous signals and controlling the rotation speed of a drum motor using the thusly detected duty interval.

These and other objects are achieved by a servo control apparatus for a motor in a magnetic tape recording and reproducing apparatus comprising reproducing means for reproducing a signal from magnetic tape; a rotation sensor sensing rotation of said motor; a phase sensor sensing a phase of said motor; speed driving signal generating means for generating a speed driving signal based on output from said rotation sensor; phase driving signal generating means for generating a phase driving signal based on output from said phase sensor; synchronizing signal generating means for receiving said reproduction signal, determining a duty interval of synchronous pulses in said reproduction signal, and generating a synchronizing signal based on said duty interval; motor driving signal generating means for generating a motor driving signal based on said speed driving signal, said phase driving signal, and said synchronizing signal; and a motor controller controlling said motor based on said motor driving signal.

These and other objects are further achieved by a servo control method for a motor in a magnetic tape recording and reproducing apparatus comprising a) reproducing a signal from magnetic tape; b) sensing rotation of said motor; c) sensing a phase of said motor; d) generating a speed driving signal based on output from said step b); e) generating a phase driving signal based on output from said step c); f) determining a duty interval of synchronous pulses in said reproduction signal; g) generating a synchronizing signal based on said duty interval; h) generating a motor driving signal based on said speed driving signal, said phase driving signal, and said synchronizing signal; and i) controlling said motor based on said motor driving signal.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIGS. 7A through 7D are wave forms of signals related to the duty detector of FIG. 5.

DETAILED DESCRIPTION OF THE INVENTION

Figure 1:
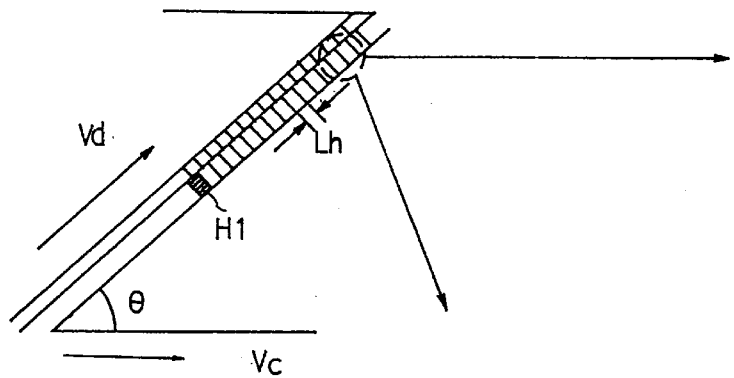
FIG. 1 is conventional art a schematic view of a video tape track.
Figure 2:
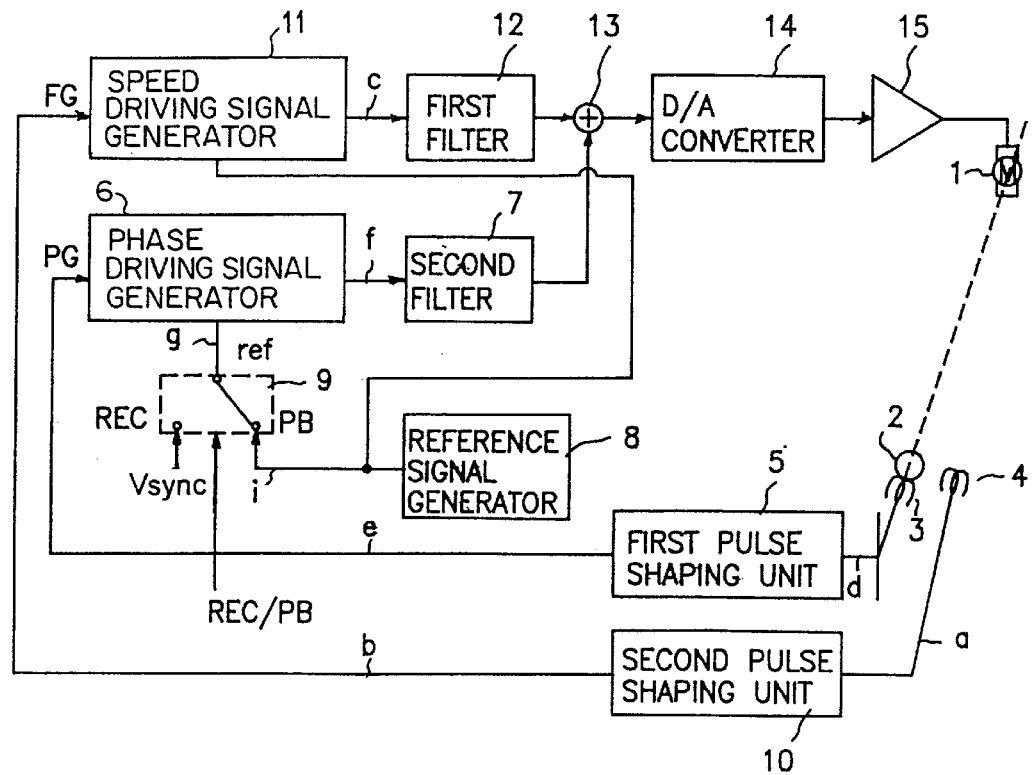
FIG. 2 is a conventional art block diagram of a drum servo control system.
Figure 3:
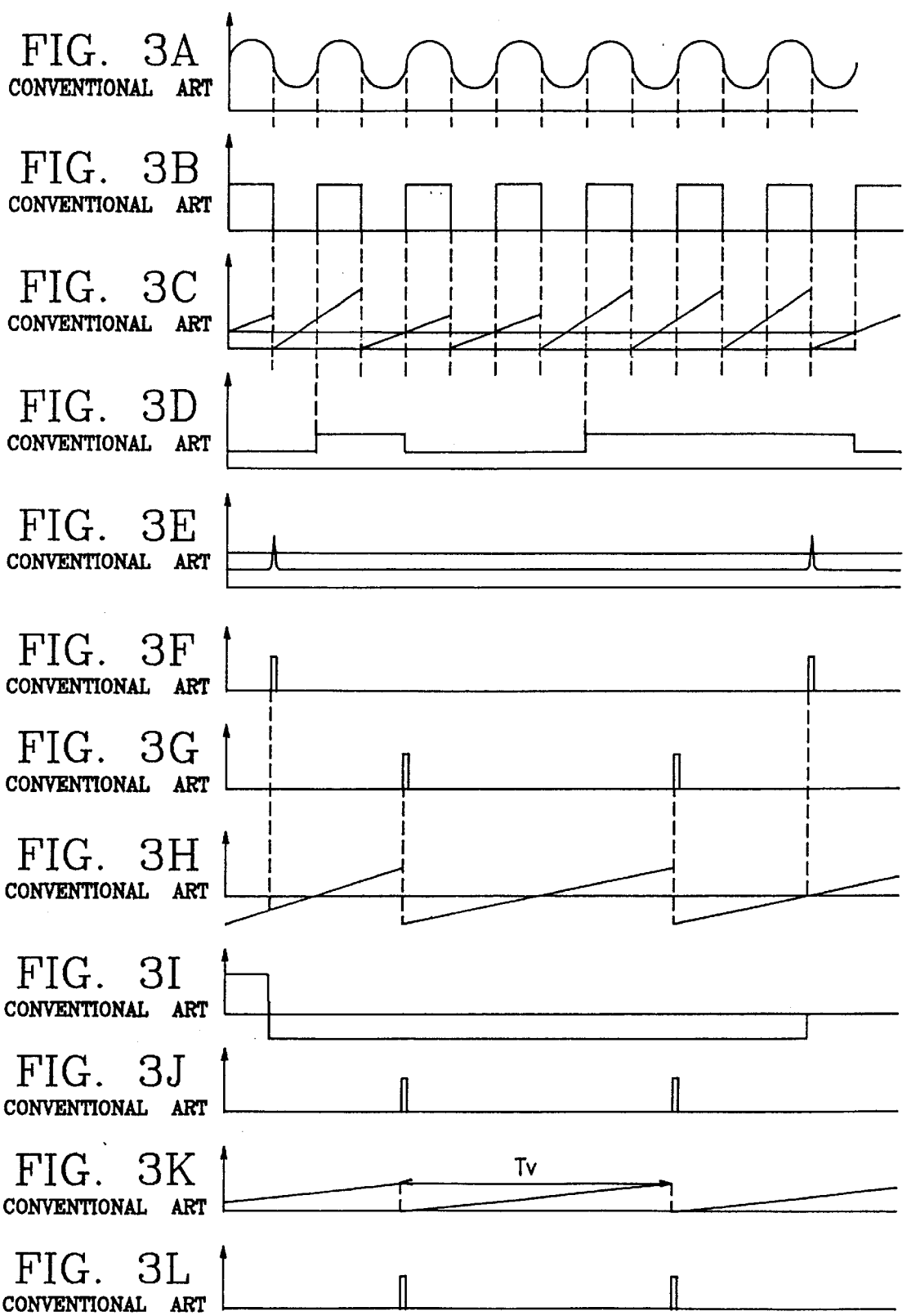
FIGS. 3A through 3L are wave forms of signals generated by the control system in FIG. 2.
Figure 4:
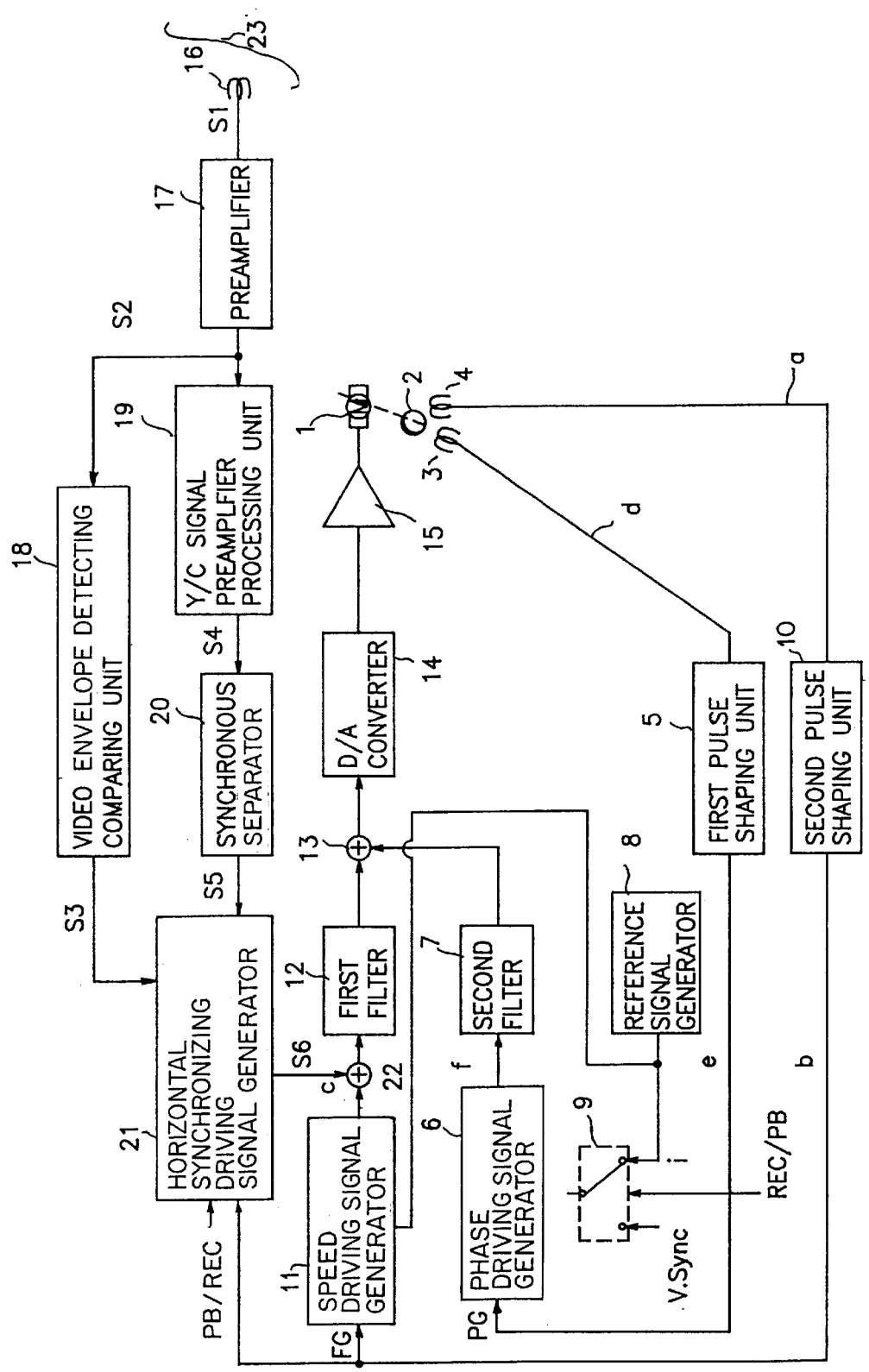
FIG. 4 is a block diagram of a servo control apparatus for a VCR of a first embodiment according to the present invention.

FIG. 4 shows a servo control apparatus for a VCR of a first embodiment according to the present invention. Magnetic sensors 3 and 4 detect phase and drum rotation of the drum motor 1. First and second pulse shaping units 5 and 10 amplify a phase detection signal and a drum rotation detection signal outputted from the magnetic sensors 3 and 4. A phrase driving signal generator 6 and a speed driving signal generator 11 generate phase and speed driving signals in accordance with a phase detection signal PG and a drum rotation detection signal FG outputted from the first and second pulse shaping units 5 and 10, respectively, as described with respect to the conventional art.

A video head 16 reads a picture high frequency signal S1 from a video tape 23. A preamplifier 17 amplifies the output picture signal of the video head 16, and a video envelope detecting comparing unit 18 detects whether the picture signal is present in accordance with the output signal of the preamplifier 17. A luminance/color (Y/C) signal processing unit 19 receives the output signal of the preamplifier 17, and processes the luminance/color signals. A synchronous separator 20 receives a picture signal outputted from the luminance/color signal processing unit 19, and separates the synchronous signals therefrom. A horizontal synchronizing driving signal generator 21 generates a synchronizing signal based on the synchronous signals, the drum rotation signal FG, and the recording/reproducing mode signal REC/PB. An adder 22 adds the speed driving signal outputted from the speed driving signal generator 11 and the synchronizing signal outputted from the horizontal synchronizing driving signal generator 21.

A speed/pulse control value adder 13 adds the output signals of the phase driving signal generator 6 and the output from the adder 22 as filtered by the filter 12. A D/A converter 14 converts the digital signal outputted from the speed/phase control value adder 13 into an analog signal. A drum motor driving unit 15 outputs a driving signal to the drum motor 1 corresponding to the output signal of the D/A converter 14.

The operation and effects of the servo control apparatus for a VCR of a first embodiment according to the present invention will now be explained with reference to the accompanying drawings.

Figure 6A:
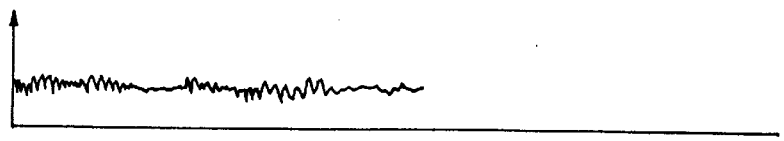
FIGS. 6A through 6L are wave forms of signals generated by the control system in FIGS. 4 and 5.
Figure 6B:
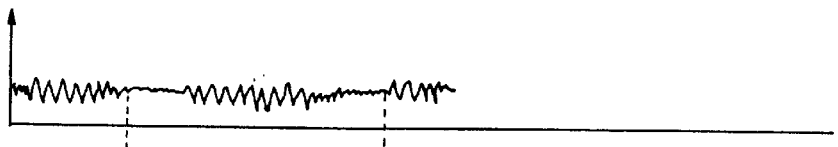
Figure 6C:
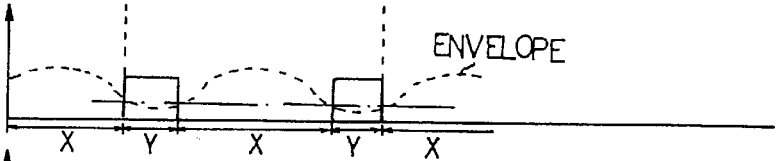

To begin with, a picture high frequency signal S1, as shown in FIG. 6A, is reproduced from the video tape 23; specifically, the video tape 23 is loaded onto the video head, is amplified to a certain level as shown in FIG. 6B, and is outputted to the video envelope detecting comparing unit 18 and to the luminance/color signal processing unit 19. The video envelope detecting comparing unit 18 filters the input picture signal S2 according to a low pass filtering method and a parabola-like wave form as shown in FIG. 6C is obtained. This parabola-like wave form is compared with a reference voltage by an operation amplifier (now shown) of the video envelop detecting comparing unit 18, and a low signal is outputted therefrom when the input picture signal is larger than that of a reference voltage (dash-dot line in FIG. 6C), and a high signal is outputted when the input picture is smaller than that of the reference voltage. As a result, the wave form of a signal outputted from the picture envelope detection comparing unit 18 is shown in FIG. 6C. Here, the low range denotes a range in which a picture signal is present, and the high range denotes a range in which a picture signal is not present.

Figure 6D:
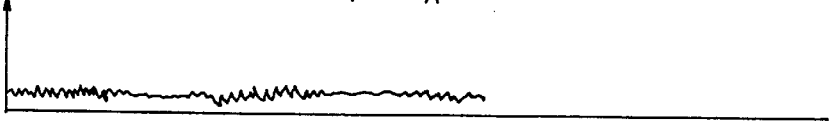
Figure 6E:
Figure 6F:
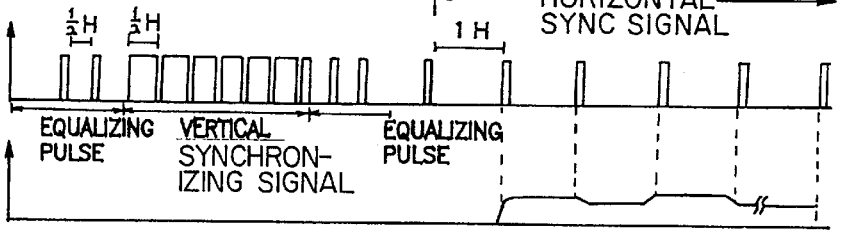

In addition, the luminance/color signal processing unit 19 processes the input picture signal according to a luminance/color processing method, and generates a picture signal (S4) as shown in FIG. 6D. This picture signal S4 is applied to the synchronous separator 20. The synchronous separator 20 separates the synchronous signals from the picture signal, and outputs a combined synchronous signal Csync (S5) as shown in FIG. 6E. FIG. 6F shows a portion of the combined synchronous signal (S5) in greater detail. As shown in FIG. 6F, the combined synchronous signal includes equalizing pulses, a vertical synchronizing signal, and horizontal synchronizing signal.

The horizontal synchronizing driving signal generator 21 detects the horizontal synchronous signal Hsync in the combined synchronous signal (S5) outputted from the synchronous separator 20, and generates a synchronizing signal with respect to the horizontal synchronous signal Hsync based on the picture judging signal (S3) outputted from the picture envelope detection comparing unit 18, the speed detection signal FG of the drum motor 1 outputted from the second pulse shaping unit 10, and the recording/reproducing mode signal REC/PB. The horizontal synchronizing signal generator 21 supplies the synchronizing signal to the adder 22 as an adjustment value signal (S6) of the speed control.

Figure 5:
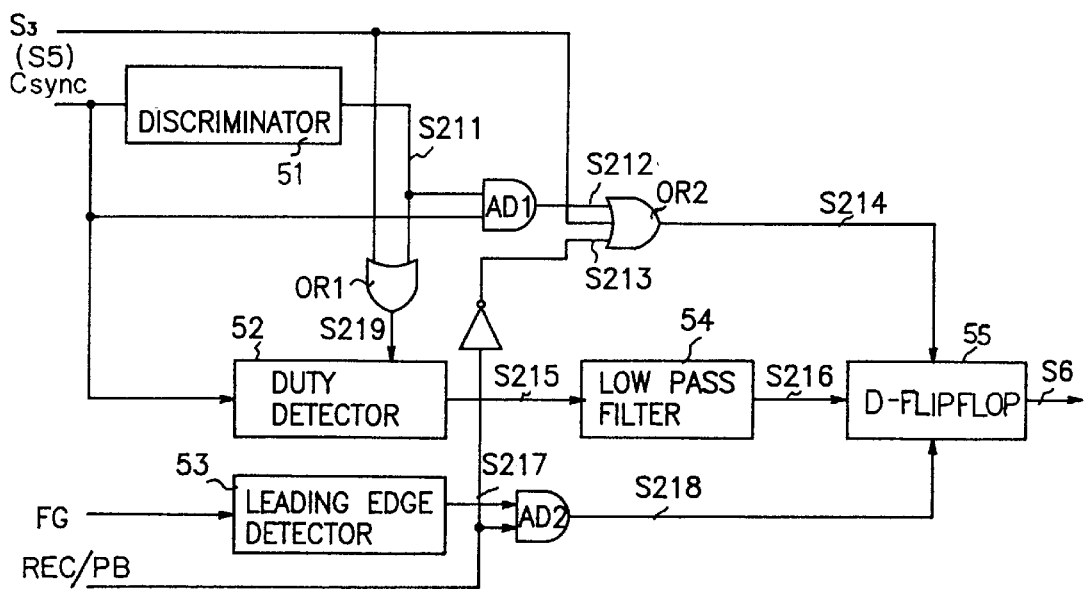
FIG. 5 is a circuit diagram of the horizontal synchronizing driving signal generator of FIG. 4 according to the present invention.

FIG. 5 shows a circuit diagram of the horizontal synchronizing driving signal generator 21. The operation of the horizontal synchronizing driving signal generator 21 will now be explained.

A discriminator 51 receives the combined synchronous signal Csync and judges whether the duty interval (i.e., interval between pulses) is less than 75% of one horizontal line having a duty of 1H. In the case of the National Television System Committee (NTSC) standard, the horizontal synchronous signal Hsync or 1H is 63.5 $\mu$sec, and 75% of 1H is about 47 $\mu$sec. When the duty of the combined synchronous signal Csync is less than 75% of 1H, the discriminator 51 outputs signal S211 having a high level (See FIG. 6H).

Figure 6G:
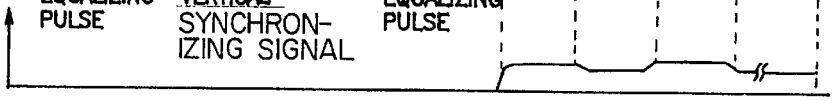
Figure 6H:
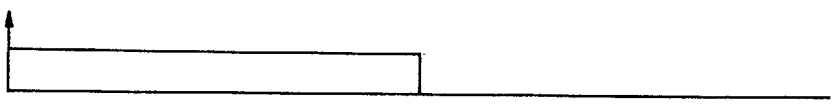
Figure 6I:
Figure 6J:
Figure 6K:
Figure 6L:

In addition, the combined synchronous signal Csync outputted from the synchronous separator 20 is applied to the duty detector 52. The count value of a counter (not shown) in the duty detector 52 is outputted at a leading edge of the combined synchronous signal Csync (S5) as shown in FIG. 7C, and the counter is reset at a decreasing edge of the combined synchronous signal Csync as shown in FIG. 7B. The signal shown in FIG. 7C is outputted as a signal as shown in FIG. 7D via a subtractor (not shown), which subtracts a reference value Href from the signal in FIG. 7C, and a synchronizing signal as shown in FIG. 6G is outputted. Here, the reference value Href is a value corresponding to Hsync or 63.5 $\mu$sec (NTSC). The synchronizing signal (S215) of the horizontal combined synchronous signal Csync is outputted from the duty detector 52, via a low pass filter 54, to the flipflop D-FF 55.

In addition, a leading edge of the drum speed detection signal FG is detected through the leading edge detector 53. The thusly detected signal and the recording/reproducing mode signals REC/PB are ANDed by the AND gate AD2, and are supplied to the flipflop D-FF 55 as a clock signal S218 synchronized with the drum speed detection signal FG. That is, at the time of controlling the speed, the duty signal of the horizontal synchronous signal Hsync is supplied to the drum speed system. Accordingly, the output of the synchronizing signal from the flip-flop D-FF 55 is synchronized with the speed detection signal FG.

In addition, the output signal S3 of the video envelope detecting comparing unit 18 and the output signal S211 of the discriminator 51 are ORed by the OR-gate OR1, and the thusly ORed signal S219 is supplied to the duty detector 52 as a reset signal RESET. The output signal S215 of the duty detector 52 becomes zero when the reset signal RESET is a high level.

In addition, the OR-gate OR2 receives the output signal S3 of the video envelope detecting comparing unit 18, an inverted REC/PB MODE signal S213 and an output signal S212, which is obtained by ANDing the output signal S211 of the discriminator 51 and the output signal S5 of the synchronous separator 20. When one of those signals is a logic high, the flipflop D-FF 55 is reset, and the output of the flipflop D-FF 55 becomes zero at the equivalent pulse portion of the vertical synchronous signal. That is, a mask process is performed for preventing malfunction.

That is, the drum is controlled by adding the synchronizing signal to the speed driving signal in accordance with a drum speed detection signal FG at a leading edge of the FG signal. That is, as a point of controlling the speed, by detecting the duty of the horizontal synchronous signal Hsync, it is possible to reduce jitters with respect to the tape recorded by another VCR.

Figure 8:
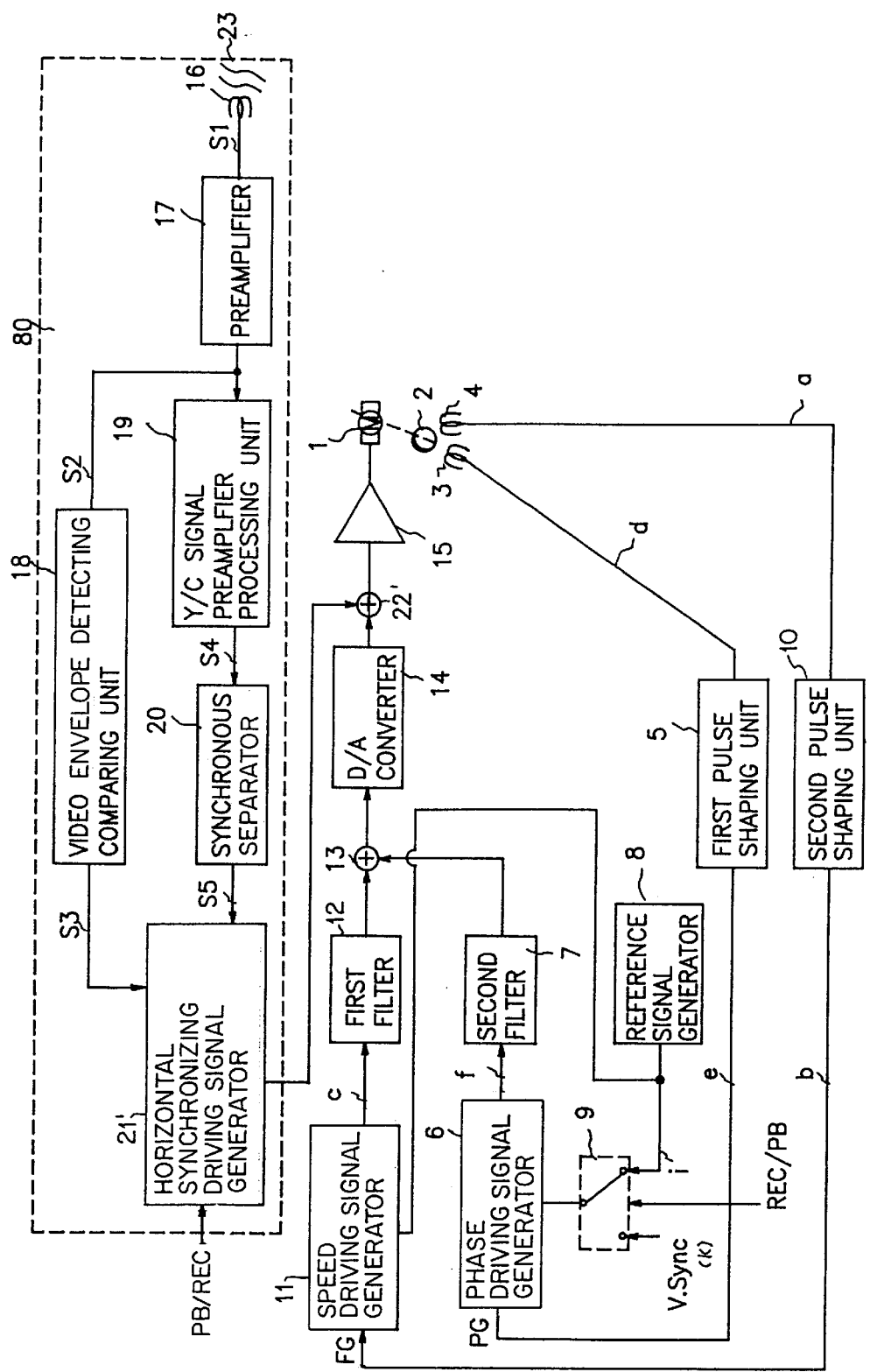
FIG. 8 is a block diagram of a servo control apparatus for a VCR according to a second embodiment of the present invention.

FIG. 8 shows another embodiment of the present invention. As shown therein, (1) the horizontal synchronizing signal generator 21 of FIG. 4 has been replaced by a horizontal synchronizing signal generator 21'; (2) the adder 22, now adder 22', is located between the D/A converter 14 and the drum motor driving unit 15 instead of between the speed driving signal generator 11 and the first filter 12; and (3) the structure of the horizontal synchronizing driving signal generator 21 is simpler than that of the first embodiment. The adder 22' is directed to adding the output signal of the D/A converter 14 and the output signal of the horizontal synchronizing driving signal generator 21', and outputs the sum to the drum motor driving unit 15 so that it is possible to simply implement the purpose of the horizontal synchronizing driving signal generator 21' as shown in FIG. 9.

The operation of the above-mentioned embodiment will now be explained with reference to the accompanying drawings.

Figure 9:
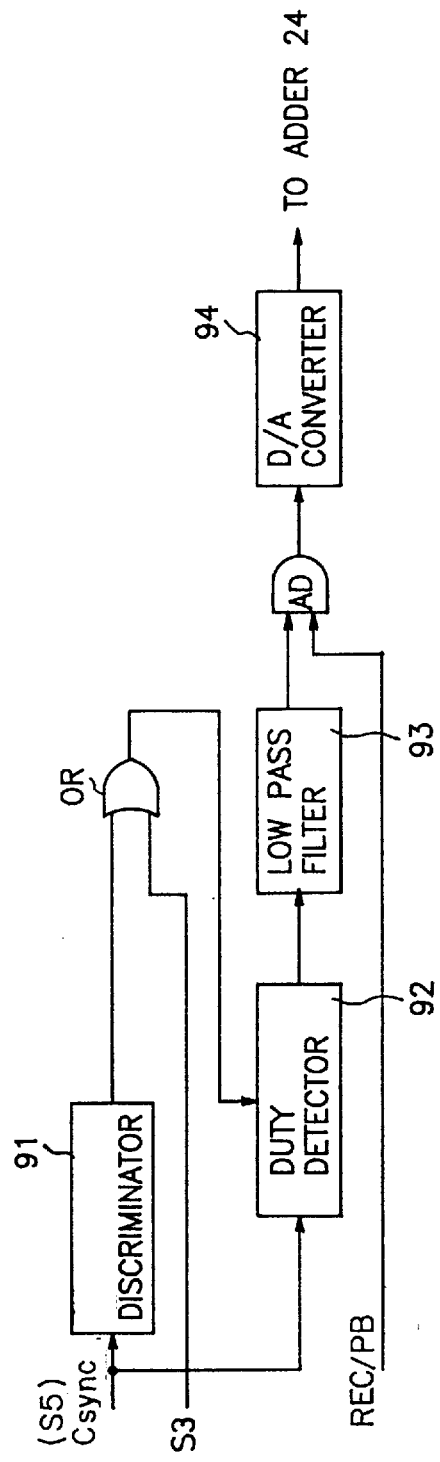
FIG. 9 is a circuit diagram of a horizontal synchronizing driving signal generator of FIG. 8 according to the present invention.

To begin with, different from the embodiment of FIG. 5, the drum speed detection signal FG is not applied to the horizontal synchronizing driving signal generator 21' as shown in FIG. 9. The recording/reproducing mode signal REC/PB is outputted to the AND-gate AD so as to output a synchronizing signal in only the reproducing mode. In addition, the synchronizing signal is generated using the discriminator 91 and the duty detector 92 (which operate in the same manner as the discriminator 51 and the duty detector 52), and the thusly detected synchronizing signal is supplied to the AND-gate AD through the low pass filter 93. In addition, the synchronizing signal outputted from the AND-gate AD is converted into an analog signal by the D/A converter 94 and outputted to the adder 22'. This embodiment improves the compensation capacity with respect to jitter by adjusting the speed of the drum motor 1 without using the FG signal.

Although the preferred embodiment of the present invention have been disclosed for illustrative purposes, those skilled in the art will appreciate that various modifications, additions and substitutions are possible, without departing from the scope and spirit of the invention as described by the accompanying claims.

What is claimed is:

1. A servo control apparatus for a motor in a magnetic tape recording and reproducing apparatus comprising:

reproducing means for reproducing a signal from said magnetic tape;

a rotation sensor sensing rotation of said motor;

a phase sensor sensing a phase of said motor;

speed driving signal generating means for generating a speed driving signal based on output from said rotation sensor;

phase driving signal generating means for generating a phase driving signal based on output from said phase sensor;

synchronizing signal generating means for receiving said reproduction signal, determining a duty interval of synchronous pulses in said reproduction signal, and generating a synchronizing signal based on said duty interval;

motor driving signal generating means for generating a motor driving signal based on said speed driving signal, said phase driving signal, and said synchronizing signal; and a motor controller controlling said motor based on said motor driving signal.

2. The apparatus of claim 1, wherein said synchronizing signal generating means comprises:

a discriminator discriminating whether an interval between said synchronous pulses is less than a predetermined interval, and outputting a reset signal when said interval is less than said predetermined interval; and reset means for resetting said synchronizing signal to zero in response to said reset signal.

3. The apparatus of claim 2, wherein said predetermined interval is 75% of a horizontal synchronous pulse interval.

4. The apparatus of claim 1, wherein said synchronizing signal generating means comprises:

an envelope detector detecting an amplitude envelope of said reproduction signal, determining whether said reproduction signal is present based on said envelope, and outputting a reset signal when said reproduction signal is not present; and reset means for resetting said synchronizing signal to zero in response to said reset signal.

5. The apparatus of claim 1, wherein said synchronizing signal generating means comprises:

means for resetting said synchronizing signal to zero when said apparatus is operating in a recording mode as indicated by a received recording/reproduction mode signal.

6. The apparatus of claim 1, wherein said synchronizing signal generating means comprises:

a synchronous separator separating said synchronous pulses from said reproduction signal; and a duty detector determining said duty interval between said synchronous pulses, and generating said synchronizing signal based on said duty interval.

7. The apparatus of claim 6, wherein said duty detector determines a difference between said duty interval and a predetermined duty interval, and outputs said difference as said synchronizing signal.

8. The apparatus of claim 6, wherein said synchronizing signal generating means further comprises:

a memory storing said synchronizing signal output from said duty detector; and synchronizing means for controlling said memory to output said synchronizing signal in synchronization with said speed driving signal.

9. The apparatus of claim 1, wherein said synchronizing 4 signal generating means determines a difference between said duty interval and a predetermined duty interval, and outputs said difference as said synchronizing signal.

10. The apparatus of claim 1, wherein said motor driving signal generating means comprises:

a first adder adding said speed driving signal and said synchronizing signal; and a second adder adding output from said first adder and said phase driving signal to generate said motor driving signal.

11. The apparatus of claim 1, wherein said motor driving signal generating means comprises:

a first adder adding said speed driving signal and said phase driving signal; and a second adder adding output from said first adder and said synchronizing signal to generate said motor driving signal.

12. A servo control method for a motor in a magnetic tape recording and reproducing apparatus comprising:

a) reproducing a signal from said magnetic tape;

b) sensing rotation of said motor;

c) sensing a phase of said motor;

d) generating a speed driving signal based on output from said step b);

e) generating a phase driving signal based on output from said step c);

f) determining a duty interval of synchronous pulses in said reproduction signal;

g) generating a synchronizing signal based on said duty interval;

h) generating a motor driving signal based on said speed driving signal, said phase driving signal, and said synchronizing signal; and i) controlling said motor based on said motor driving signal.

13. The method of claim 12, further comprising:

j) discriminating whether an interval between said synchronous pulses is less than a predetermined interval; and k) resetting said synchronizing signal to zero when said interval is less than said predetermined interval.

14. The method of claim 13, wherein said predetermined interval is 75% of a horizontal synchronous pulse interval.

15. The method of claim 12, further comprising:

j) detecting an amplitude envelope of said reproduction signal;

k) determining whether said reproduction signal is present based on said envelope; and l) resetting said synchronizing signal to zero when said reproduction signal is not present.

16. The method of claim 12, further comprising:

j) resetting said synchronizing signal to zero when said method is operating in a recording mode as indicated by a received recording/reproduction mode signal.

17. The method of claim 12, wherein step f) comprises:

f1) separating said synchronous pulses from said reproduction signal; and f2) determining said duty interval between said synchronous pulses.

18. The method of claim 17, wherein said step g) comprises:

g1) determining a difference between said duty interval and a predetermined duty interval; and g2) outputting said difference as said synchronizing signal.

19. The method of claim 17, wherein said step g) comprises:

g1) storing said synchronizing signal in a memory; and g2) controlling said memory to output said synchronizing signal in synchronization with said speed driving signal.

20. The method of claim 12, wherein said step g) comprises:

g1) determining a difference between said duty interval and a predetermined duty interval; and g2) outputting said difference as said synchronizing signal.

21. The method of claim 12, wherein said step h) comprises:

h1) adding said speed driving signal and said synchronizing signal; and h2) adding output from said step h1) and said phase driving signal to generate said motor driving signal.

22. The method of claim 12, wherein said step h) comprises:

h1) adding said speed driving signal and said phase driving signal; and h2) adding output from said step h1) and said synchronizing signal to generate said motor driving signal.

* * * * *